(12) United States Patent
Tran

(10) Patent No.: US 6,273,140 B1
(45) Date of Patent: Aug. 14, 2001

(54) CLUSTER VALVE FOR SEMICONDUCTOR WAFER PROCESSING SYSTEMS

(75) Inventor: Toan Q. Tran, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/318,231

(22) Filed: May 25, 1999

(51) Int. Cl.[7] ........................................... F16K 11/10
(52) U.S. Cl. ............................... 137/887; 137/613
(58) Field of Search .................... 137/883, 884, 137/887, 613

(56) References Cited

U.S. PATENT DOCUMENTS

| 3,076,631 | * | 2/1963 | Grove | 251/358 |
| 5,232,023 | * | 8/1993 | Zimmerly | 137/637.2 |
| 5,467,796 | * | 11/1995 | Pettinaroli et al. | 137/887 |

* cited by examiner

*Primary Examiner*—John Fox
(74) *Attorney, Agent, or Firm*—Thomason, Moser & Patterson, LLP

(57) ABSTRACT

A valve assembly comprises a valve body having an interior valve seat and a plurality of adapter ports. A non-metallic sealing material provides a vacuum seal between mating surfaces of adjacent vacuum components, and direct physical contact between mating surfaces ensures good thermal conduction within the valve assembly.

9 Claims, 8 Drawing Sheets ously connected to the vacuum coupler 102 via a valve 108. The isolation valve 104 is used to isolate the process chamber body 101 from the pumping foreline 110, while the throttle valve 106 allows control of the pumping capacity. O-ring seals are typically used to provide vacuum sealing between the flanges of the vacuum components. The existing design of vacuum flange couplings incorporating an O-ring seal usually leaves a space between the mating vacuum flanges. This is illustrated in FIG. 1 by the gaps 112, 114 and 116 between the chamber body 101, vacuum coupler 102, isolation valve 104, and the throttle valve 106. The non-metallic O-ring material is also a poor thermal conductor. As such, there is minimal heat transfer between the process chamber body 101 and components in the exhaust assembly 100, such as the isolation valve 104 and the throttle valve 106.

CLUSTER VALVE FOR SEMICONDUCTOR WAFER PROCESSING SYSTEMS

BACKGROUND OF THE DISCLOSURE

1. Field of the Invention

The invention relates to a vacuum valve assembly and, more particularly, to a cluster valve for use with semiconductor wafer processing systems.

2. Description of the Background Art

Semiconductor wafer processes such as plasma etching and chemical vapor deposition (CVD) are often performed in sub-atmospheric conditions. To ensure peak performance in wafer processing, efficient operation of an exhaust assembly is required in order to pump away reaction by-products and maintain a fresh supply of reactant gases to the process chamber. FIG. 1 illustrates schematically a typical exhaust assembly 100 connected to a chamber body 101. The exhaust assembly 100 comprises for example, a vacuum coupler 102, with an isolation valve 104 and a throttle valve 106 for control of the pumping operation. Diagnostic accessories (not shown) may also be connected to the vacuum coupler 102 via a valve 108. The isolation valve 104 is used to isolate the process chamber body 101 from the pumping foreline 110, while the throttle valve 106 allows control of the pumping capacity. O-ring seals are typically used to provide vacuum sealing between the flanges of the vacuum components. The existing design of vacuum flange couplings incorporating an O-ring seal usually leaves a space between the mating vacuum flanges. This is illustrated in FIG. 1 by the gaps 112, 114 and 116 between the chamber body 101, vacuum coupler 102, isolation valve 104, and the throttle valve 106. The non-metallic O-ring material is also a poor thermal conductor. As such, there is minimal heat transfer between the process chamber body 101 and components in the exhaust assembly 100, such as the isolation valve 104 and the throttle valve 106.

In many CVD applications, the process gases and by-products are often non-volatile or readily condensable, and may result in undesirable deposits inside the chamber body 101 or the exhaust assembly 100. For example, in the deposition of silicon using a reaction of tetraethyl orthosilicate (TEOS) and ozone ($O_3$), TEOS and reaction by-products tend to condense onto cold interior surfaces of the exhaust assembly 100. The accumulation of these deposits leads to clogging of the vacuum components such as the isolation valve 104 and the throttle valve 106, and contributes to a deterioration of the pumping capacity and process performance. At a pressure of about 200 torr, TEOS condenses at temperatures below about 65° C. Therefore, it is common practice to maintain the chamber body 101 and the exhaust assembly 100 at some elevated temperature to minimize the formation of these deposits. The chamber body 101, for example, may be heated by a resistive heater embedded in a chamber liner (not shown). In certain applications, a heater used to maintain a wafer support pedestal at an optimal processing temperature may also contribute to heating the chamber body 101. The exhaust assembly 100 is typically heated externally by heating tapes or cartridge heaters (not shown) around the various vacuum components. However, these heaters invariably add to the cost and complexity of the operation of the exhaust assembly 100. The need for external heaters for the exhaust assembly 100 can be eliminated if thermal conduction can be improved between the heated chamber body 101 and the exhaust assembly 100.

In addition to heating, the process chamber 101 and the exhaust assembly 100 are also subjected to periodic dry cleaning procedures using chlorine ($Cl_2$) or nitrogen fluoride ($NF_3$) gases in either thermal or plasma conditions. The throttle valve 106, being located farthest downstream in the exhaust assembly 100, may not be as efficiently cleaned as, for example, the isolation valve 104, due in part to the depletion of the reactive cleaning gas.

Therefore, there is an ongoing need for alternatives to facilitate equipment maintenance by providing a more compact design and improved thermal conduction between the chamber body 101 and the exhaust assembly 100.

SUMMARY OF THE INVENTION

The present invention is a vacuum exhaust assembly designed for efficient maintenance and improved thermal conduction. The exhaust/valve assembly comprises a valve body having an interior valve seat and several adapter ports for connection to other vacuum components. Direct physical contacts are maintained between adjacent mating surfaces to ensure good thermal conduction among the vacuum components.

When the valve assembly is used as an exhaust assembly for a wafer processing system, the valve body is connected directly to a process chamber, which is maintained at an elevated temperature to minimize undesirable deposits inside the chamber. The present embodiment allows the entire exhaust assembly to be maintained at substantially the same elevated temperature without the need for external heaters. The compact design of the present invention also results in more efficient dry cleaning of the valve components in the exhaust assembly.

BRIEF DESCRIPTION OF THE DRAWINGS

The teachings of the present invention can be readily understood by considering the following detailed description in conjunction with the accompanying drawings, in which:

FIG. 3b depicts a perspective view of an adapter plate of FIG. 3a;

FIG. 4a depicts a perspective view of the valve body shown in FIG. 3a;

FIG. 4b depicts a cross-sectional view along line 4–4' of the valve body of FIG. 3a;

FIG. 5a depicts an exploded perspective view of the throttle valve of FIG. 3a;

FIG. 5c depicts a schematic cross-sectional view of an assembled throttle valve along line 5–5' of FIG. 3a.

To facilitate understanding, identical reference numerals have been used, where possible, to designate identical elements that are common to the figures.

DETAILED DESCRIPTION

The present invention takes a two prong approach in the design of an exhaust system. First, the vacuum coupling between adjacent components is designed to have substantial direct physical (metal-to-metal) contact, eliminating any space between the mating components. As such, good thermal contact can be achieved between the chamber body 101 and the individual vacuum components in the exhaust assembly. Second, a compact cluster valve design is adopted to allow the valves, e.g., the isolation and throttle valves 104, 106 to be mounted as close to the chamber body 101 as possible. This improves the efficiency of the dry cleaning process by ensuring the availability of reactive species throughout the exhaust assembly.

Figure 1:
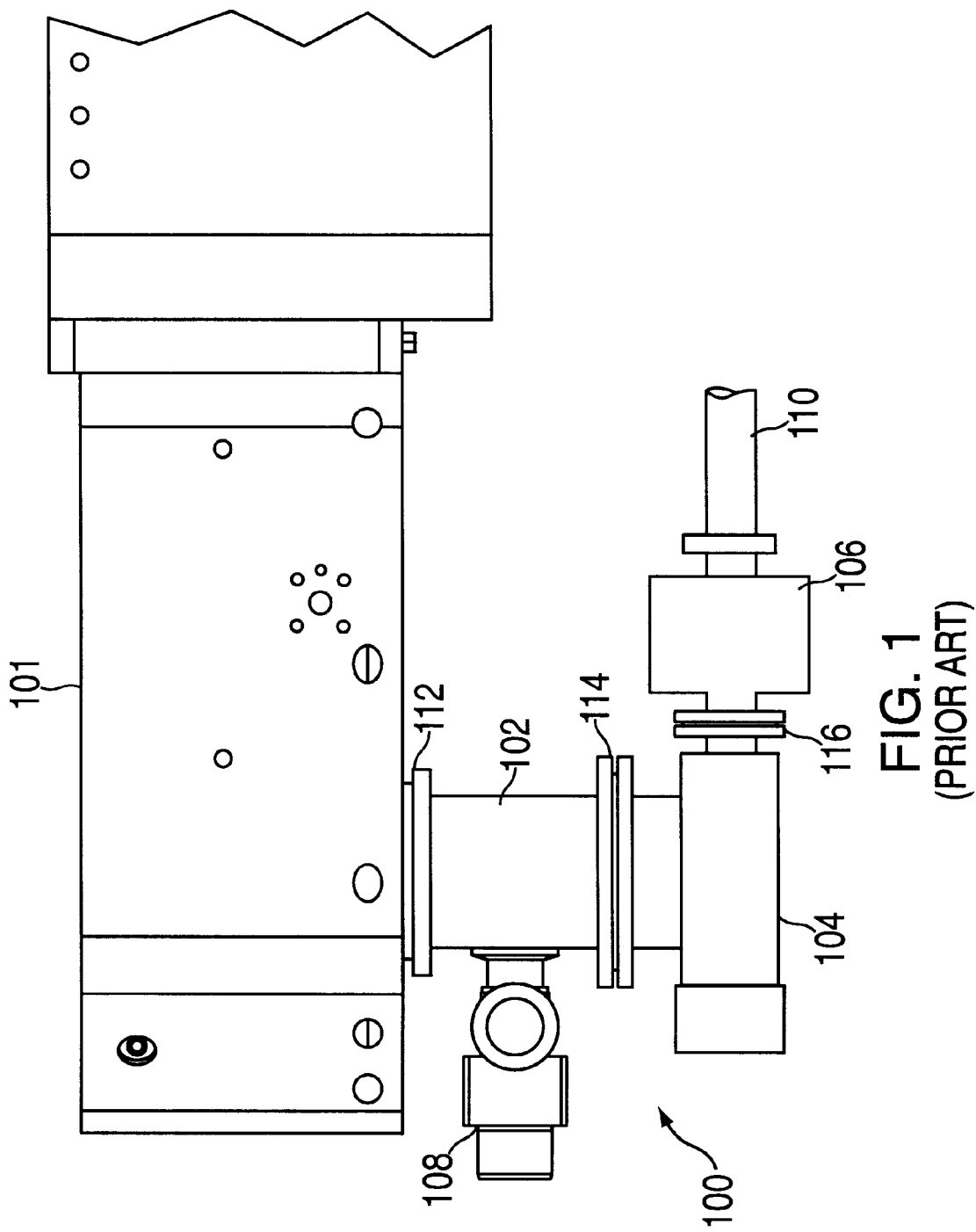
FIG. 1 depicts a schematic representation of a prior art exhaust assembly.
Figure 2:
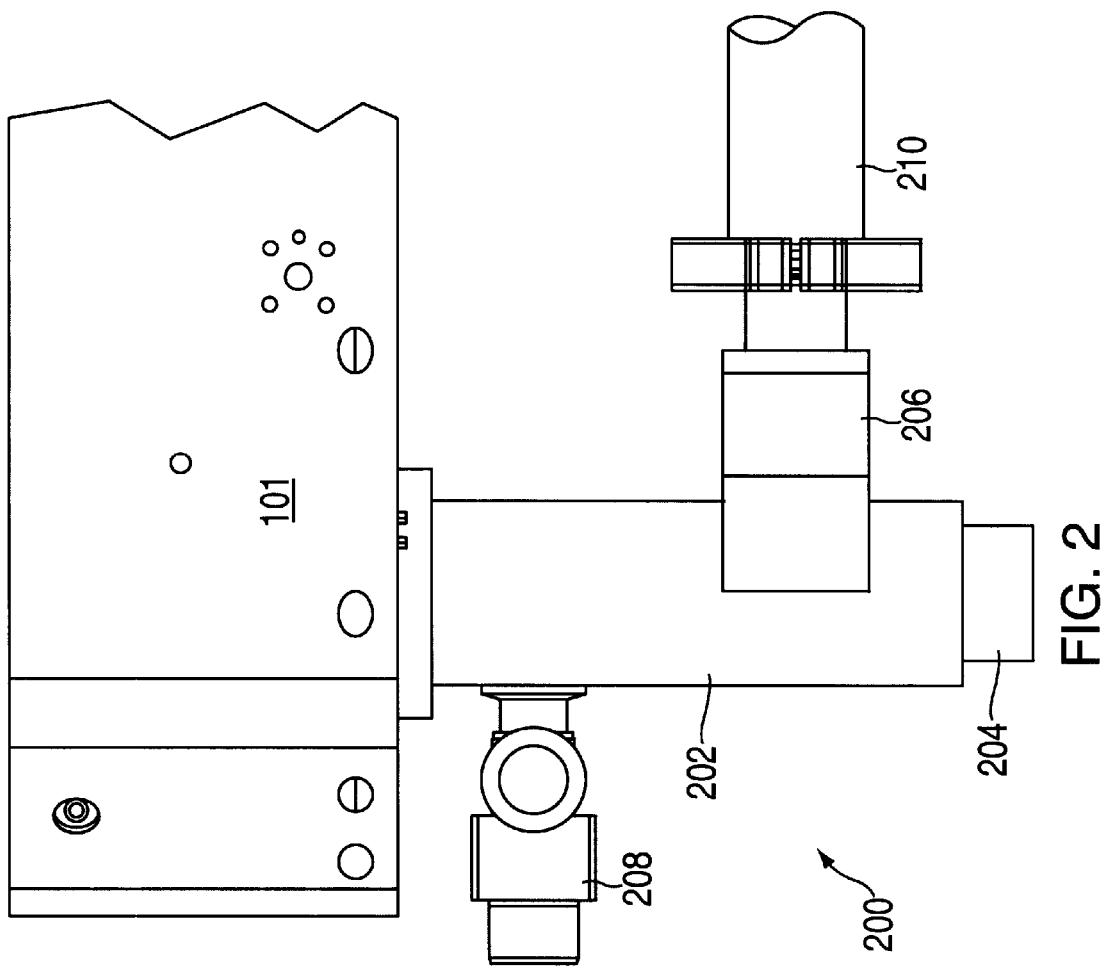
FIG. 2 depicts a schematic representation of an exhaust assembly incorporating the present invention.

FIG. 2 is a schematic illustration of a cluster valve design of an exhaust assembly 200 of the present invention. The cluster valve/exhaust assembly 200 is directly connected to the chamber body 101 of a semiconductor wafer processing system (not shown). The cluster valve assembly 200 comprises several valves 204, 206 and 208 mounted to a single valve body 202. For example, the valve 208 may be a manual valve which allows accessories such as leak testing or diagnostic equipment (not shown) to be connected to the exhaust assembly 200. The pumping foreline 210 is connected to the valve 206, which may, for example, be a throttle valve.

Cluster Valve Assembly

Figure 3A:
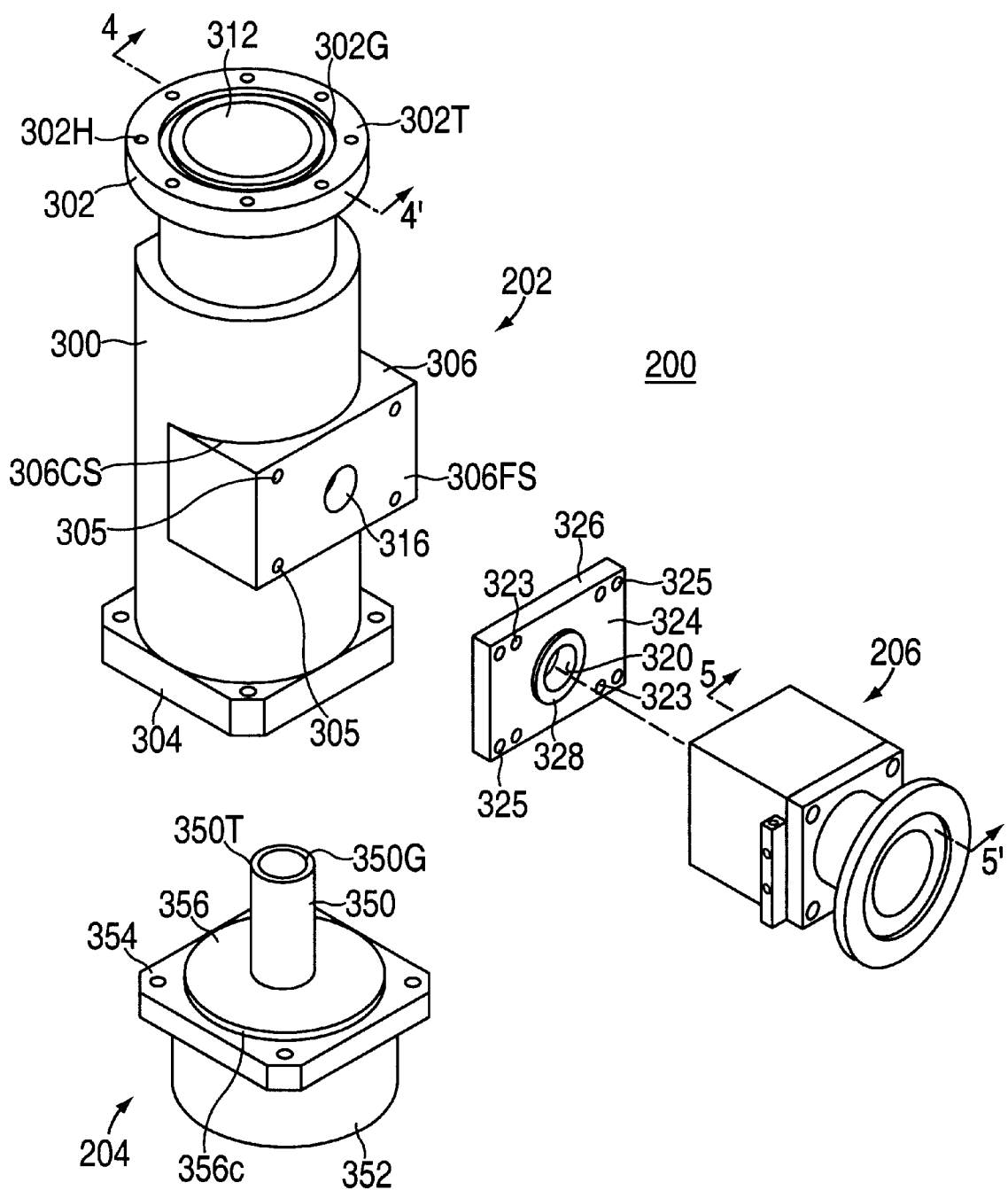
FIG. 3a depicts an exploded perspective view of a cluster valve assembly of the present invention.
Figure 4B:
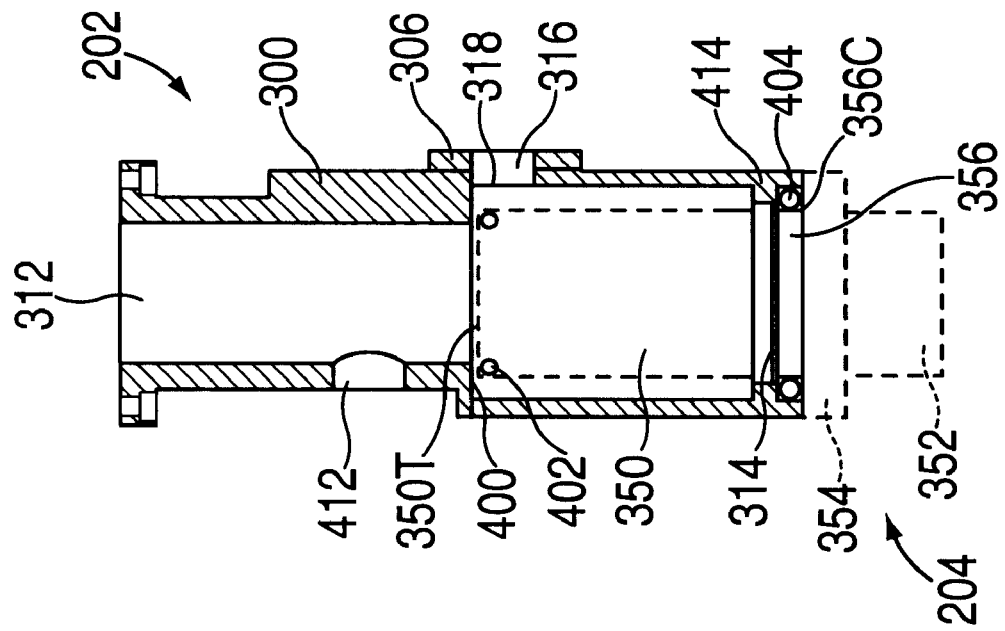
Figure 4A:
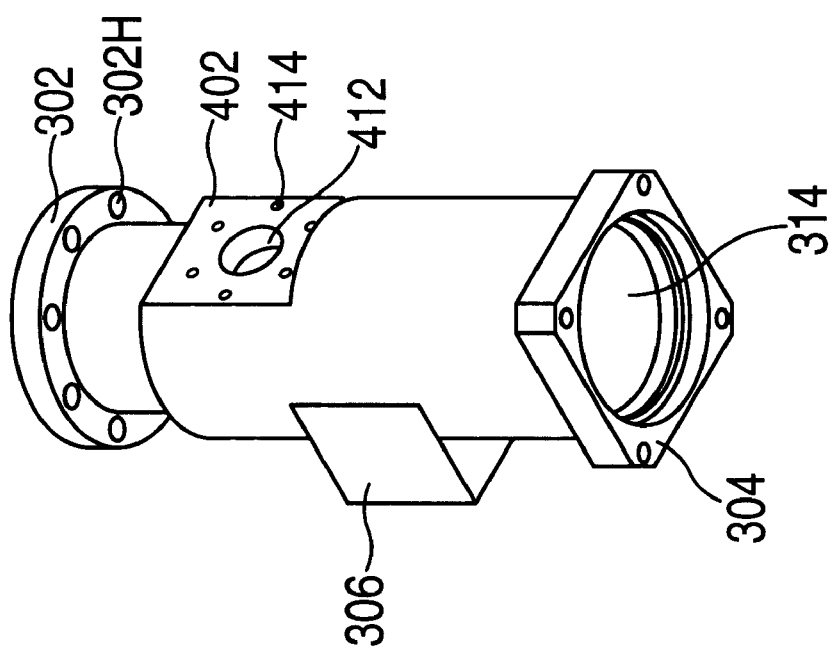

FIG. 3a depicts schematically a partially exploded, perspective view of the cluster valve assembly 200 of the present invention, comprising a valve body 202, an isolation valve 204 and a throttle valve 206. FIG. 4a illustrates another perspective view of the valve body 202 and FIG. 4b shows a cross-sectional view of the valve body 202 along the line 4–4' of FIG. 3a. In one embodiment, an adapter plate 326 is used to couple the throttle valve 206 to the valve body 202. However, it can optionally be designed as an integral part, for example, as a flange, of the throttle valve 206.

As shown in FIGS. 3a, 4a and 4b, the valve body 202 resembles a hollow cylinder, having a cylindrical side 300, with openings 312, 314, 316, 412 defined in various portions 302, 304, 306, 402 of the valve body 202. These openings 312, 314, 316, 412, along with flanges 302, 304, 306 and the recessed portion 402 are generally referred to as "adapter ports" for the valve body 202. The present embodiment is meant to illustrate the design flexibility of these adapter ports, which can take on different sizes and shapes, and may be constructed as externally attached structure (e.g., flanges 306, 302) or integral to the valve body 202 (e.g., recessed portion 402). The top flange 302, for example, is used to couple the valve body 202 to the chamber body 101 of a semiconductor wafer processing system. The side flange 306 is used for mounting a throttle valve 206 via the adapter plate 326, while the bottom flange 304 allows coupling to an isolation valve 204. Like other adapter ports, the flat recessed portion 402 shown in FIG. 4a have mounting holes 414 provided for connecting to other vacuum components—for example, a manual valve 208 of FIG. 2.

The valve body 202 also comprises an interior valve seat 400 which provides sealing for the isolation valve 204. Although only one interior valve seat 400 is provided in the valve body 202 of this embodiment, the design can be adapted to accommodate additional valve seats if necessary.

Referring to FIG. 3a, the top flange 302 of the valve body 202 is configured to have an O-ring groove 302G circumscribing the opening 312. A plurality of clearance holes 302H, eight in this example, are provided for mounting the valve body 202 to the chamber body 101. The O-ring groove 302G has a rectangular cross-section, and is designed such that when the two mating surfaces are coupled together, an O-ring (not shown), or gasket, installed inside the groove 302G does not protrude above the top surface 302T of the flange 302. As such, there is a direct physical contact between the mating surfaces, and good thermal contact can be ensured for the two adjacent components—e.g., the valve body 202 and the chamber body 101. As an illustrative example, a CVD chamber using a thermal reaction between tetraethyl orthosilicate (TEOS) and ozone ($O_3$) for silicon deposition has to be maintained at a temperature above approximately 65° C. to avoid undesirable deposits inside the chamber. In contrast to prior art, the present invention allows the cluster valve, or exhaust assembly 200 to be kept at a temperature above 65° C. without the need for external heaters or heating tapes. All O-ring connections in the cluster valve assembly 200 use the same groove design, such that there are substantial direct metal-to-metal contacts between the valve body 202 and other connecting vacuum components, including valves 204, 206 and the adapter plate 326. In general, the O-ring used in the groove 302G may be made of different materials, as long as they are compatible with the chemical and thermal environment around the chamber body 101 and the valve body 202. A Chemres O-ring, for example, is chemically compatible with the process exhaust or cleaning gases which are used in a CVD chamber, including for example, TEOS, $O_3$ and $NF_3$, among others. The use of the term "O-ring" is meant to be illustrative only, and vacuum sealing can generally be accomplished by using gaskets, as well as other materials, including both metals and non-metals. The valve body 202, adapter plate 326 and the throttle valve housing 500 are made of aluminum to improve thermal conduction among the components. Depending on the specific application, other materials, for example, stainless steel, may also be used.

Figure 3B:
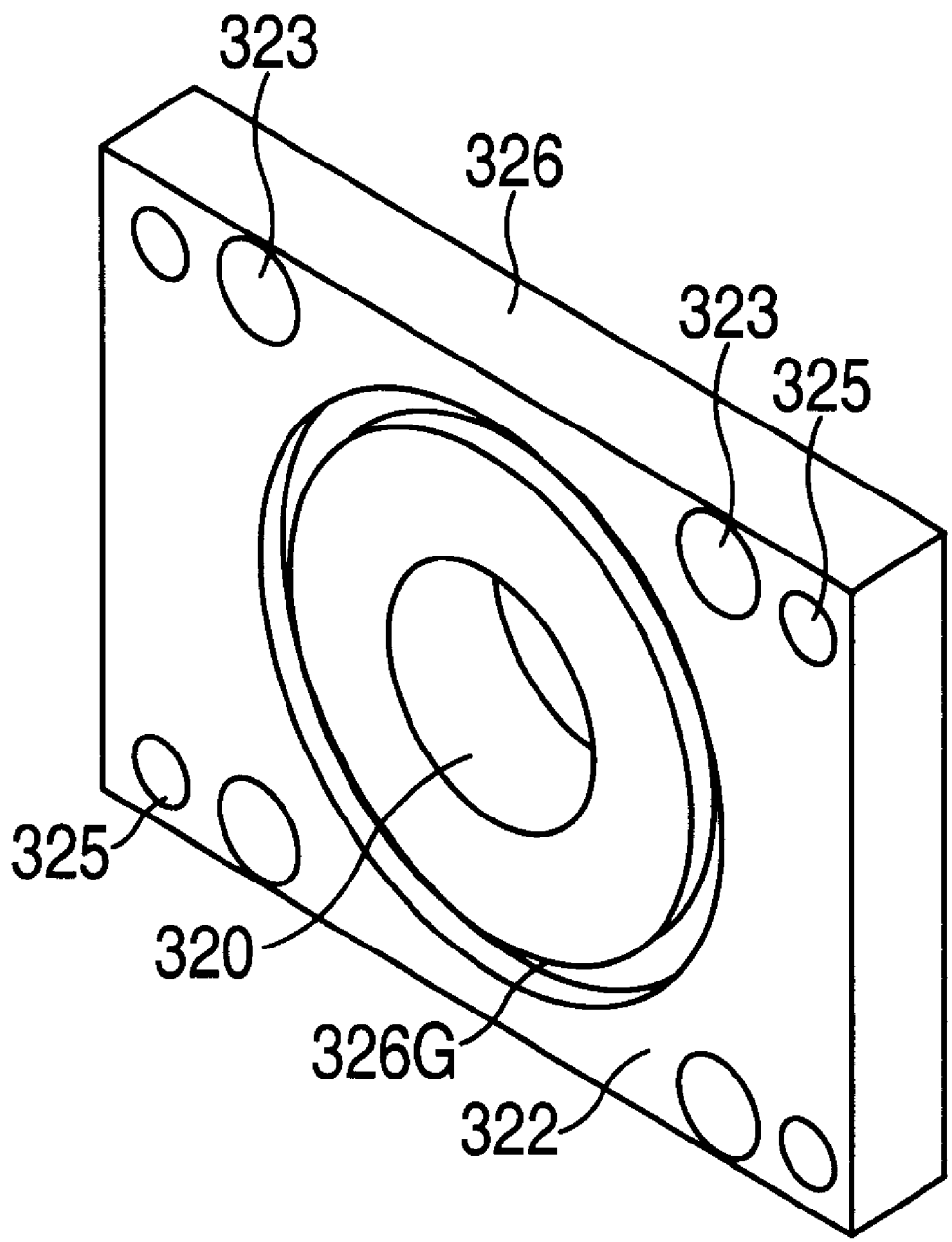

The valve body 202 is also provided with a side flange 306 to allow for connection to additional components, such as the throttle valve 206. The side flange 306 is designed with a concave cylindrical surface 306CS, which is complementarily shaped and welded to the cylindrical side 300 of the valve body 202. The side flange 306 also has a flat surface 306FS with an opening 316, which aligns with a side opening 318 (see FIG. 4b) in the cylindrical side 300 of the valve body 202. In the present embodiment, an adapter plate 326 is used to couple the side flange 306 to the throttle valve 206. The adapter plate 326 is substantially rectangular in shape, and has an opening 320 defined to align with the opening 318 of the side flange 306. As shown in FIG. 3b, the adapter plate 326 has an O-ring groove 326G on the surface 322 which mates to the side flange 306 of the valve body 202. An O-ring (not shown), or gasket, is used inside the O-ring groove 326G, to provide sealing between the adapter plate 326 and the flat surface 306FS of the side flange 306. Again, the O-ring may be made of different materials, and Kalrez, for example, has been used in one embodiment of the present invention. The other surface 324 (see FIG. 3a) of the adapter plate 326 has an annular lip 328 around the opening 320, and one set of four clearance holes 323 is provided for mounting the adapter plate 326 to the throttle valve housing 500. Another set of four clearance holes 325 (the "outside" set) is used for mounting the adapter plate 326, along with the throttle valve 206, onto the side flange 306 of the valve body 202 via corresponding tapped holes 305.

Throttle Valve

Figure 5A:
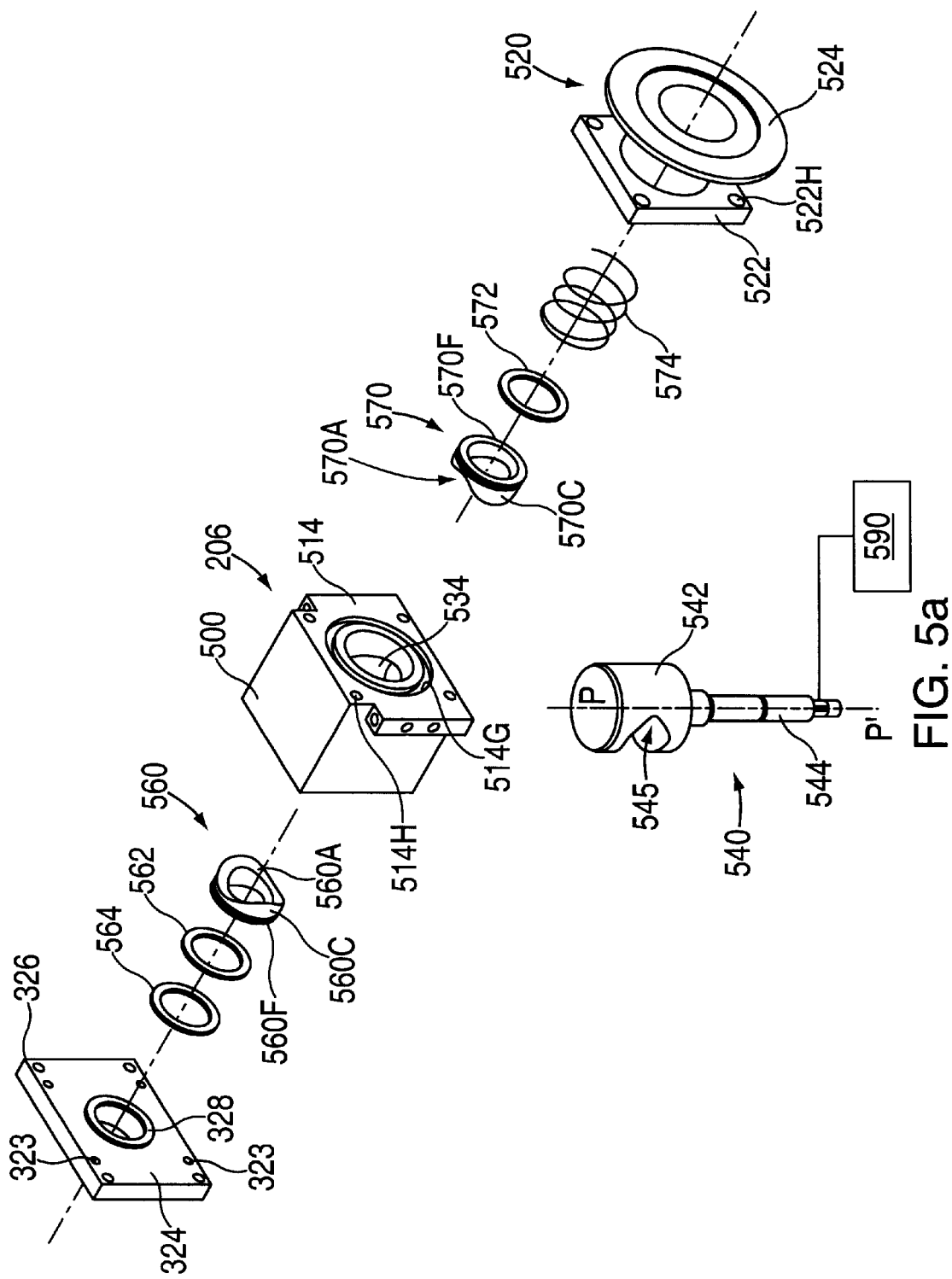
Figure 5B:
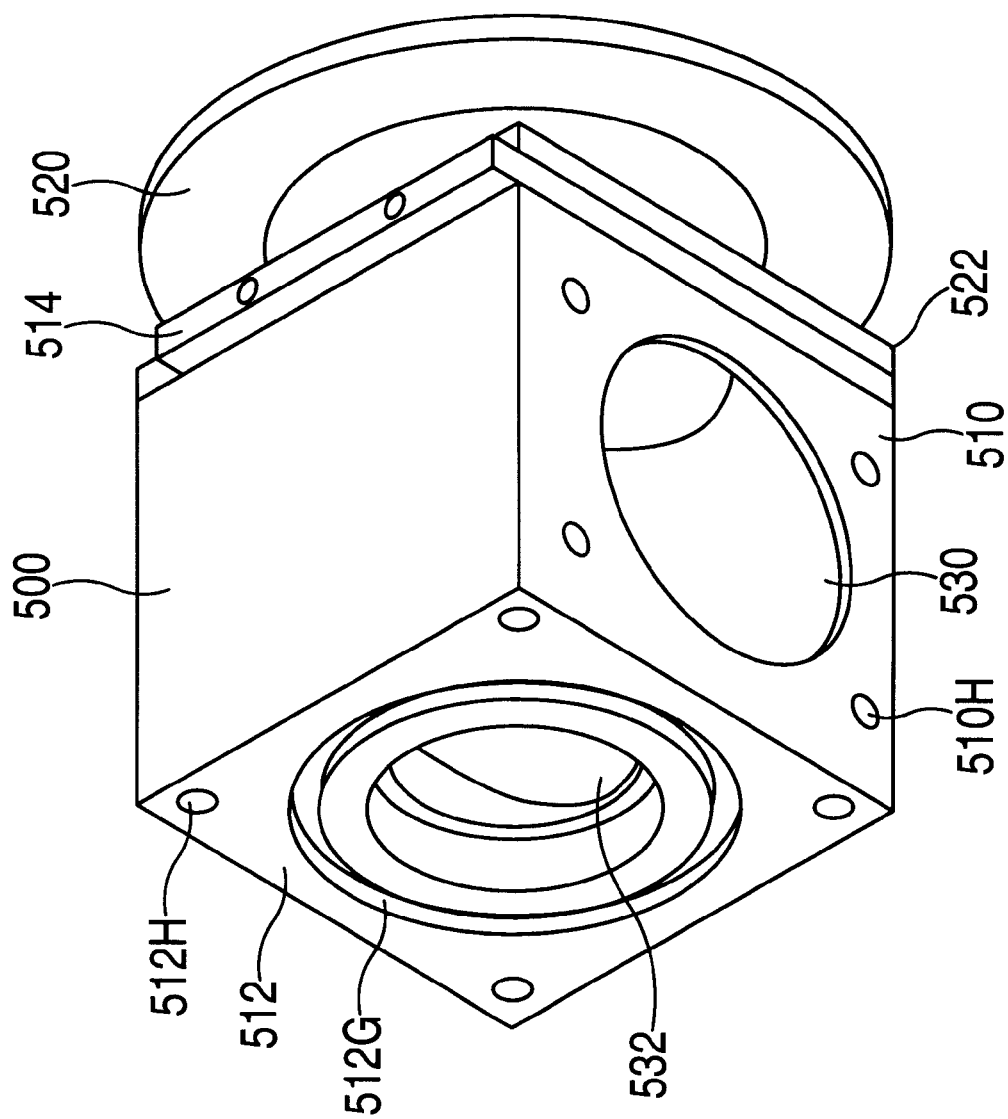
FIG. 5b depicts a perspective view of the throttle valve housing of FIG. 5b.
Figure 5C:
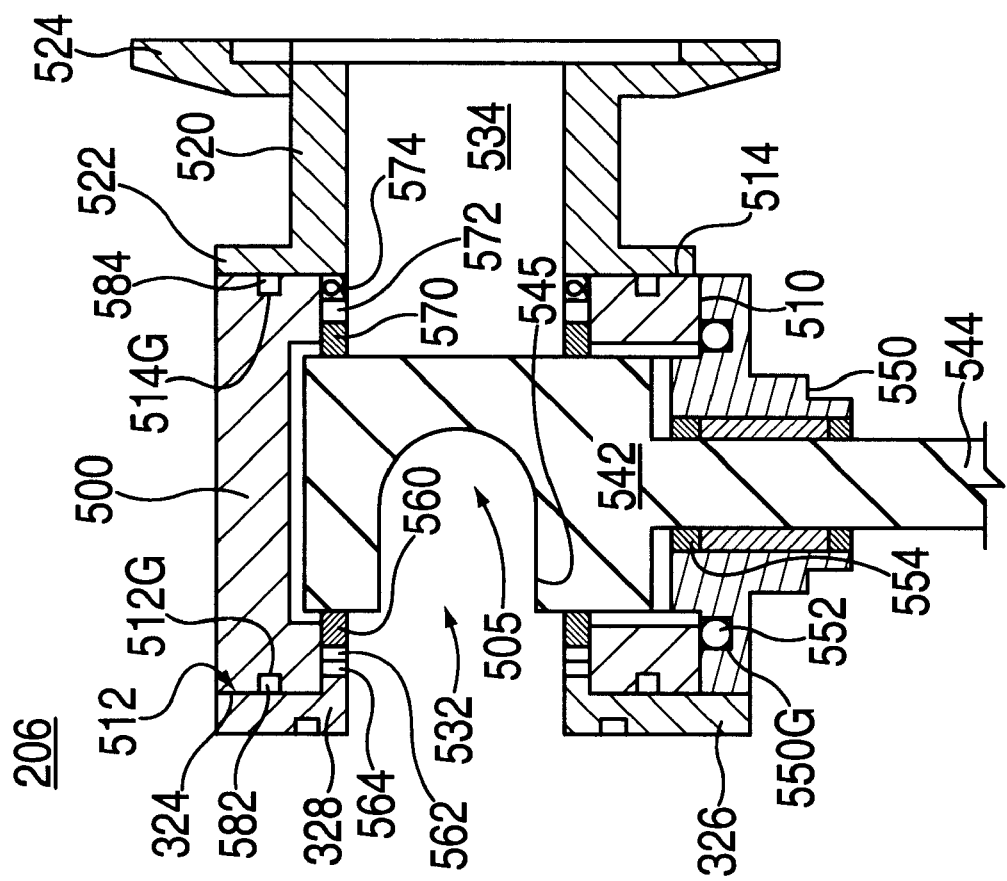

FIG. 5a illustrates an exploded, perspective view of the throttle valve 206. The throttle valve 206 comprises a housing 500, a plunger 540 disposed inside the housing 500, housing flange adapter 520, and miscellaneous washers and inserts (560, 562, 564; and 570, 572, 574). FIG. 5b illustrates another perspective view of the throttle valve housing 500, and FIG. 5c depicts a schematic cross-sectional view of the assembled throttle valve 206. The housing 500 is substantially cubicle in shape, having a central chamber 505 connected to three openings 530, 532, 534 which are disposed at three of the surfaces 510, 512 and 514. The surface 514 (see FIG. 5a) is rectangular in shape, and has an O-ring groove 514G circumscribing the opening 534. The surface 514 is coupled to a flange adapter 520, which comprises a substantially square flange 522 connected to a circular flange 524. An O-ring 584 inside the groove 514G provides sealing between the throttle housing 500 and the square flange 522 of the flange adapter 520. The flange adapter 520 is mounted onto the housing 500 by bolts (not shown) through clearance holes 522H on the square flange 522 and tapped holes 514H provided at the surface 514. A teflon insert 570, a flat washer 572 and a spring 574 are held in place inside the housing opening 534 between the flange adapter 520 and the housing 500. In the present embodiment, the circular flange 524 is connected to the foreline 210. The teflon insert 570 resembles an annular cylinder comprising a flat outside surface 570F, a cylindrical portion 570C and an inside surface 570A which is arcuately-shaped. When the flange adapter 520 is bolted onto the housing surface 514, the spring 574 biases the flat washer 572 against the flat surface 570F of the teflon insert 570, with the cylindrical portion 570C protruding inside the central chamber 505 of the housing 500. The cylindrical portion 570C is arcuately shaped at the "inside" surface 570A.

FIG. 5b shows the surface 512 of the housing 500 (opposite the surface 514) having an O-ring groove 512G circumscribing the opening 532. An O-ring 582 made of suitable materials (e.g., viton, Chemres, Kalrez, among others) is used to provide sealing between the throttle valve housing 500 and the surface 324 of the adapter plate 326. (See FIG. 5c.) The opening 532 of the housing 500 is sized such that the annular lip 328 of the adapter plate 326 fits inside the opening 532. Additionally, a ridge-shaped teflon washer 564, a flat washer 562, and a teflon insert 560 are fitted inside the opening 532. The teflon insert 560 is similar to the teflon insert 570, and has a flat surface 560F, an annular cylindrical portion 560C having an arcuate inside surface 560A. The housing 500 and the adapter plate 326 can be attached, for example, by using screws (not shown) through clearance holes 323 on the adapter plate 326 and tapped holes 512H on the surface 512 of the housing 500. In the assembled state, the annular lip 328 of the adapter plate 326 presses against the ridge-shaped teflon washer 564, which in turn presses against the flat washer 562. The ridge-shaped design of the teflon washer 564 provides a degree of compliance and maintains a positive bias pressure against the flat washer 562 and the flat surface 560F of the teflon insert 560. In this capacity, the teflon washer 564 serves a similar role as that of the spring 574. The annular cylindrical portion 560C of the teflon insert 560 also protrudes inside the central chamber 505 of the housing 500.

As shown in FIGS. 5b and 5c, the surface 510 of the housing 500 is provided with an opening 530 to accommodate the plunger 540 of the throttle valve 206. The plunger 540 comprises a cylindrical portion 542 and a shaft 544. The cylindrical portion 542 is disposed inside the housing 500 and has a cutout portion, or recess 545, such that the cylindrical portion 542 has a substantially C-shaped cross-section, as shown in FIG. 5c. The shaft 544 is connected to a gear box 590 which can drive the plunger 540 to rotate inside the housing 500 to either close or open the throttle valve 206. The plunger 540 is secured inside the housing 500 by a mounting assembly 550, which incorporates a gasket 554 for sealing around the shaft 544 and an O-ring 552 for sealing between the mounting plate 550 and the housing 500. As illustrated in FIG. 5c, when the throttle valve 206 is bolted onto the adapter plate 326, with an O-ring 582 providing a vacuum seal, a direct physical contact (metal-to-metal) is maintained between the adjacent mating surfaces—i.e., surface 324 of the adapter plate 326 and surface 512 of the housing 500. As such, good thermal conduction is achieved between the throttle valve 206 and the adapter plate 326, and thus, with the valve body 202.

The annular cylindrical portions 560C, 570C of the teflon inserts 560, 570 are both arcuately shaped to be complementary (or conformal) to the cylindrical portion 542 of the plunger 540. When the gear box 590 actuates the throttle valve 206 to rotate the plunger 540 about its vertical axis P–P' (see FIG. 5a), intimate physical contacts (and thus, vacuum sealing) are maintained between the cylindrical portion 542 and the teflon inserts 560, 570. In general, the teflon inserts 560, 570 may also be referred to as "sealing members". When the throttle valve 206 is open, the recess 545 is aligned longitudinally with the openings 532, 534. As such, a passageway is provided for exhaust gases to flow through the throttle valve 206. When the throttle valve 206 is closed, the cylindrical portion 542 of the plunger 540 is rotated, for example, by about 90 degrees from the open position. In the closed position, as illustrated in FIG. 5c, the recess 545 is no longer aligned with the openings 532, 534, and there is no passageway (i.e., exhaust gas flow is prevented) between the openings 532 and 534 of the throttle valve 206. Thus, the valve body 202 and the isolation valve 204 are closed off from the vacuum foreline 210 by the throttle valve 206.

Isolation Valve

Referring back to FIG. 3a, the bottom flange 304 of the valve body 202 is machined to be adaptable to an isolation valve 204, which for example, can be purchased from MKS Instruments as part number 100010102LPV-50-Sqr. The isolation valve 204, a pneumatic valve in this embodiment, comprises a valve stem 350 connected to a valve cylinder 352 and a mounting flange 354 which mates directly to the bottom flange 304 of the valve body 202. The mounting flange 354 is provided with a circular protruded portion 356, which is sized to fit inside the cylindrical side 300 of the valve body 202. As illustrated in FIG. 4b, an O-ring 404, which may be made of viton, for example, fits around the circumference 356C of the protruded portion 356 of the flange 354, and provides vacuum sealing between the flange 354 and a shoulder 414 provided inside the valve body 202. The isolation valve 204 is configured as a normally closed valve such that the valve stem 350, which has a groove 350G (with a rectangular cross-section) at its top 350T to accommodate an O-ring 402, is normally sealed against a valve seat 400 inside the valve body 202. As such, the isolation valve 204 is integrally connected to the valve body 202. The O-ring 402 used in this embodiment is made of Chemres, although other suitable materials may also be used for other applications. As shown in FIG. 4b, the interior valve seat 400 is positioned slightly above the side opening 318 of the valve body 202, such that when the isolation valve 204 (shown in phantom) is closed, the top opening 312 of the valve body 202 is sealed off from the side opening 318. Thus, the chamber body 101 of the semiconductor wafer processing system can be isolated from the throttle valve 206. To open the isolation valve 204, the valve cylinder 352 is filled with compressed air, which moves the valve stem 350 downwards against a bias spring (not shown), away from the valve seat 400. As such, the side opening 318 is connected to the top opening 312 of the valve body 202, providing a passageway for exhaust gases to pass through.

Since all the O-ring groove connections used in the cluster valve/exhaust assembly 200 are designed to allow for substantial metal-to-metal contacts between adjacent components, good thermal conduction can be maintained between the chamber body 101 and the entire exhaust assembly 200, including the throttle valve 206. For example, using the present invention, the throttle valve 206 can readily be maintained at substantially the same temperature as that of the chamber body 101, e.g., above 65° C., without the need for external heaters. With the valve assembly 200 maintained at an elevated temperature, the compact design of the assembly 200 also enhances the efficiency of dry cleaning of the throttle valve 206. As such, formation of undesirable deposits inside the exhaust assembly 200 can be minimized, resulting in improved operation of the wafer processing system by reducing the need for frequent cleaning or maintenance of the exhaust assembly 200.

Although several preferred embodiments which incorporate the teachings of the present invention have been shown and described in detail, those skilled in the art can readily devise many other varied embodiments that still incorporate these teachings.

What is claimed is:

1. A valve assembly comprising:
   a valve body having an interior valve seat and a plurality of adapter ports;
   a first valve integrally connected to said valve body at a first of said adapter ports to allow a sealing contact with said interior valve seat;
   a second valve connected to said valve body at a second of said adapter ports, said second valve having a recess in a cylindrical plunger that is capable of being rotated to provide a first passageway between said second adapter port and an outlet of said second valve through said recess;
   wherein direct physical contacts are maintained between respective mating surfaces of said adapter ports and said first and second valves, with sealing materials disposed between adjacent mating surfaces for effective vacuum sealing.

2. The valve assembly of claim 1, wherein effective vacuum sealing between said valve body and said first and second valves are maintained by non-metallic sealing materials disposed in grooves provided in said mating surfaces.

3. The valve assembly of claim 2, wherein said second valve comprises:
   a valve housing having a first opening defined in a first surface, a second opening defined in a second surface, and a centrally-located chamber connected to said first and second openings;
   a plunger having a cylindrical portion inside said chamber, said cylindrical portion capable of being disposed in a first position to define said first passageway to allow gas flow between said first opening and said second opening, and in a second position to prevent gas flow between said first opening and said second opening;
   a first sealing member disposed at said first opening, said first sealing member having a first end and a second end;
   a second sealing member disposed at said second opening, said second sealing member having a first end and a second end;
   wherein said cylindrical portion of said plunger maintains simultaneous sealing contacts with said first end of said first sealing member and with said first end of said second sealing member.

4. The valve assembly of claim 3, wherein said first ends of said first and second sealing members of said second valve have arcuate surfaces conforming to said cylindrical portion of said plunger.

5. The valve assembly of claim 4, further comprising:
   a first adapter connected to said first surface of said valve housing for exerting pressure against said second end of said first sealing member to maintain sealing contact between said first end of first sealing member and said cylindrical portion of said plunger; and
   a second adapter connected to said second surface of said valve housing for exerting pressure against said second end of said second sealing member to maintain sealing contact between said first end of second sealing member and said cylindrical portion of said plunger.

6. The valve assembly of claim 5, wherein said first adapter is further connected to said valve body and said second adapter is further connected to a vacuum pump.

7. The valve assembly of claim 1, wherein a second passageway between a third adapter port of said valve body and said second adapter port is blocked when said first valve is in sealing contact with said interior valve seat inside said valve body.

8. A valve assembly comprising:
   a valve body having an interior valve seat and a plurality of adapter ports;
   a first valve integrally connected to said valve body at a first of said adapter ports to allow a sealing contact with said interior valve seat;
   a second valve connected to said valve body at a second of said adapter ports, said second valve comprising:
      a valve housing having a first opening defined in a first surface, a second opening defined in a second surface, and a centrally-located chamber connected to said first and second openings;
      a first vacuum adapter in sealing and direct physical contact with said first surface of said valve housing;
      a second vacuum adapter in sealing and direct physical contact with said second surface of said valve housing;
      a plunger having a cylindrical portion inside said chamber, said cylindrical portion capable of being disposed in a first position to define a passageway to allow gas flow between said first opening and said second opening, and in a second position to prevent gas flow between said first opening and said second opening;
      wherein said cylindrical portion of said plunger maintains simultaneous sealing contacts with a first sealing member retained at said first opening and a second sealing member retained at said second opening when said cylindrical portion is being disposed between said first and second positions; and
   direct physical contacts are maintained between respective mating surfaces of said adapter ports and said first and second valves, with sealing materials disposed between adjacent mating surfaces for effective vacuum sealing.

9. The valve assembly of claim 8, wherein said first and second sealing members of said second valve are arcuately shaped to conform to said cylindrical portion of said plunger, and said cylindrical portion of said plunger can be disposed between said first position and said second position by rotation of said plunger.

* * * * *